C. C. KLEIN.
Carrier Pulley.
No. 218,886. Patented Aug. 26, 1879.
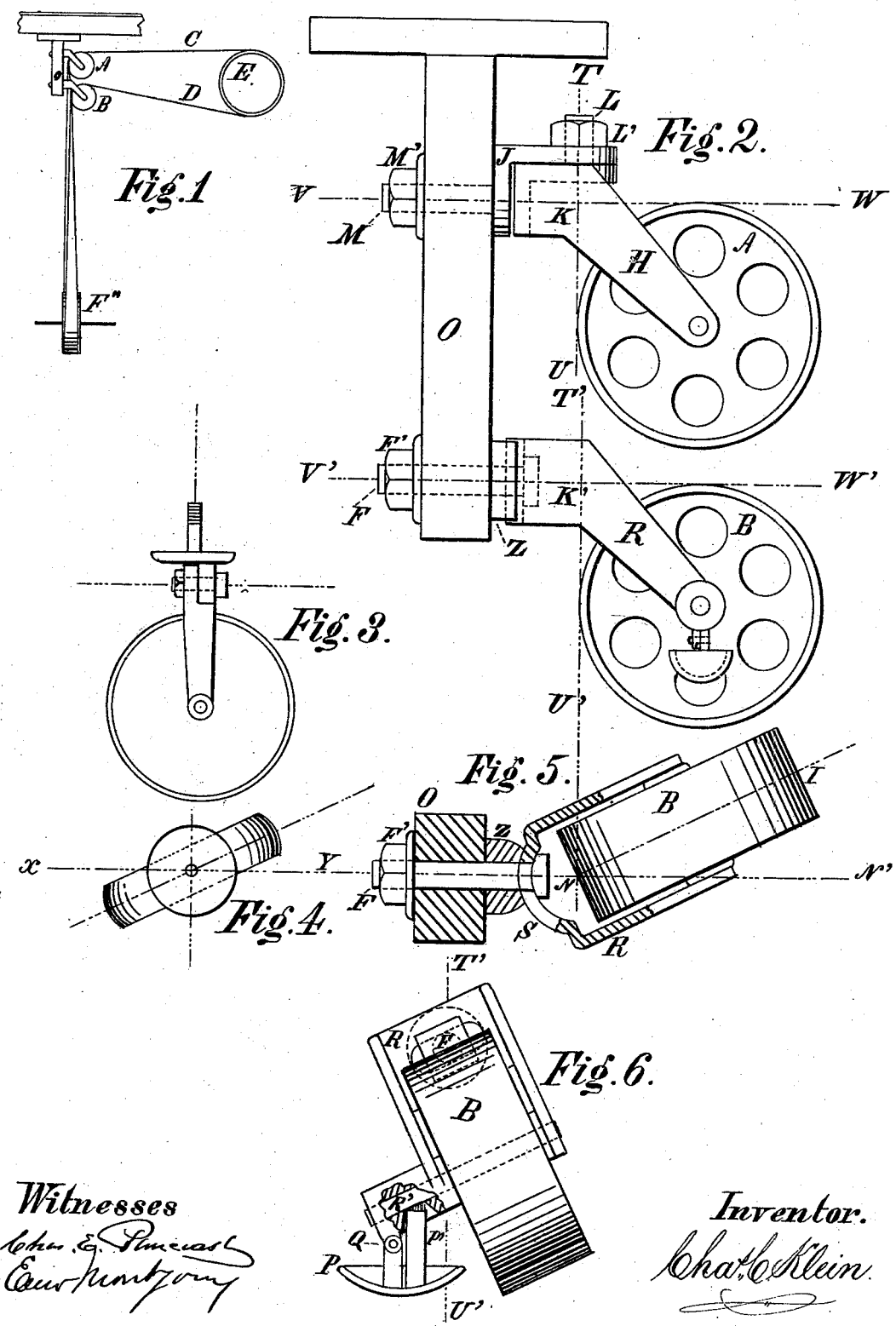
Witnesses
Inventor.

UNITED STATES PATENT OFFICE.

CHARLES C. KLEIN, OF PHILADELPHIA, PENNSYLVANIA.

IMPROVEMENT IN CARRIER-PULLEYS.

Specification forming part of Letters Patent No. 218,886, dated August 26, 1879; application filed July 8, 1879.

*To all whom it may concern:*

Be it known that I, CHARLES C. KLEIN, of Philadelphia, in the county of Philadelphia and State of Pennsylvania, have invented certain new and useful Improvements in Carrier-Pulleys, which improvements are fully set forth in the following specification, reference being had to the accompanying drawings, in which—

Figure 1 shows one of the ways in which the carrier-pulleys are applied. Fig. 2 is a side view of the apparatus; Fig. 5, a section through V' W', Fig. 2; Fig. 6, a front view of the lower pulley and frame; and Figs. 3 and 4 are views of an appliance now in common use and technically known as a "gallows-pulley."

The devices now in use for purposes similar to that for which my invention is intended are known by the technical terms of "muley-pulleys," "angular driving," and "gallows pulleys," each one of which has defects inherent in and inseparable from its construction, and all lack universal adaptability, as each is only suited for its particular purpose, and in many cases each has to be constructed especially for its peculiar situation, entailing thereby a great amount of labor in drafting and pattern-making and millwright-work.

The object of my invention will be more fully understood by reference to Fig. 1, and by tracing the effect which would be produced by using the common gallows-pulley, Figs. 3 and 4, to carry the belt between the pulleys E and F, Fig. 1.

It is evident that the horizontal portions C and D of the belt must coincide with a vertical plane, which would be at right angles with the axis of the pulley E, and would cut the latter through the center of its face; hence the top part of the face of the pulleys A and B must also coincide with that plane, however much the bottom face of the pulleys may be deflected from it.

If we now use the gallows-pulley, Figs. 3 and 4, whose frame has two adjusting-pivots, (indicated by dotted lines in Fig. 3,) to carry the belt between E and F'', and attempt to deflect the gallows-pulley to lead the belt properly onto the pulley F, we will find that in deflecting the lower part of the pulley we have at the same time moved the upper part out of the vertical plane in which it should have remained. This will be more clearly understood by reference to the line X Y passing through Fig. 4, and which is a projection of the vertical plane heretofore mentioned. Those points in the face of the pulley which are at right angles with the center line of the pivot, around which the pulley has been adjusted, are both removed from the plane X Y, owing to the wrong position of the pivot. The same effect is produced, though in a less degree, by adjusting the gallows-pulley around its other pivot.

The object of my invention is to furnish a carrier for belts which transmit power between shafts not parallel with each other, the carrying-pulleys of which being hung or suspended by a universal joint or its equivalent in such a manner that the adjustment of these pulleys in one direction shall not interfere with or disturb their proper position in another direction, so that less skill is required to put the carrier in place than has been the case heretofore.

A further object is to furnish an apparatus which will be universally adapted to carry belts around angles, whether they lie in vertical, horizontal, or inclined planes.

The first object is accomplished by placing the center of motion of the universal joint by which the pulleys are suspended in the point of intersection of the tangent lines of the belt in which the latter approaches and leaves the carrier-pulleys.

The second object is attained by attaching the frames of the carrier-pulleys to a standard, O.

Let V W and V' W' and T U and T' U', Fig. 2, represent the tangential lines in which the belt enters upon and leaves the carrier-pulleys A and B, it follows, that a universal joint having its center of motion at the intersections K and K' would permit the deflection of the pulleys A and B in a vertical and horizontal direction in such a manner that that part of the face of the carrier-pulley around which as a center the adjustment is made would always coincide with the plane of the belt.

As a ball-and-socket joint at the points K K' would interfere with the room required for the belt in passing around the pulleys A and B, I prefer to accomplish the purpose by swinging the pulley-frame H on pivots L and M, whose axes meet in the point K. The pivot L on the pulley-frame H answers at the same time as a means of fastening the frame to the bracket J by screwing up the nut L'. The bracket J swings around the pivot M, and is fastened firmly by the nut M' when the adjustment is completed.

By reference to Fig. 1 it will be noticed that the part C of the belt must pass between the post O and pulley B in order to reach the pulley F'', which makes it necessary, first, that the pulley B should be slightly farther from the post O than the pulley A, as indicated in Fig. 2 by lines T U and T' U'; and, second, that the pulley-frame R must be provided with a substitute for the pivot L, as the latter would interfere with the passage of the belt. For this purpose the pulley-frame R, Figs. 5, 2, and 6, is provided with a slotted arch, S, having its center at N, Fig. 5, the latter point being a projection of the line T' U', Fig. 2. A shoe, Z, provided with a curved surface corresponding to the convex surface of the arch S, is interposed between the standard O and the pulley-frame R, and the whole is capable of swinging around the pivot-bolt, F, which, with the nut F', serves to hold the pulley-frame securely after the adjustment is made. Fig. 5 also shows that the point I of the face of the pulley B may be deflected from the plane N' N without bringing the opposite point of the face N from its normal position in the plane N' N. The deflection of the lower part of the face of the pulley B from a vertical plane around the pivot F is shown in Fig. 6, the top part of the face still coinciding with the vertical plane T' U'.

The standard or post O may be attached to the ceiling, as in Fig. 1. It may be set upon the floor or fastened against a wall to suit the various requirements in practice.

When the pulleys are deflected from a vertical position into an inclined one, as indicated in Fig. 6, difficulty is experienced in the lubrication of the journals. To overcome this I provide a drip-cup, P, suspended from the journal-box by a pivot, Q, whose axis is parallel with that of the pivot F, so that the drip-cup will always hang level. The oil runs into the drip-cup from the journal, and is carried again to the journal by the wick P'.

What I claim as my invention is—

1. The combination of the pulley-frame H, provided with a tangential pivot, L, bracket J, provided with the tangential pivot M, and the carrier-pulley A, substantially as and for the purpose specified.

2. The combination of the arched pulley-frame R, shoe Z, pivot-bolt F, and nut F', and the carrier-pulley B, substantially as and for the purpose set forth.

3. The carrier-pulley A, with its tangentially-pivoted frame and tangentially-pivoted bracket J, and the carrier-pulley B, with its arched frame R, shoe Z, bolt F, and nut F', in combination with the standard O, substantially as and for the purpose specified.

4. In combination with the tangentially-pivoted pulley-frame R, the drip-cup P, pivot Q, and lubricating-wick P', substantially as and for the purpose specified.

CHAS. C. KLEIN.

Witnesses:
CHAS. E. PANCOAST,
EDW. MONTGOMERY.